US010056763B2

(12) United States Patent
Kutkut

(10) Patent No.: US 10,056,763 B2
(45) Date of Patent: Aug. 21, 2018

(54) AUTONOMOUS BATTERY CHARGING SYSTEM AND RELATED METHODS

(71) Applicant: Advanced Charging Technologies Inc., La Miranda, CA (US)

(72) Inventor: Nasser Hasan Kutkut, Orlando, FL (US)

(73) Assignee: Advanced Charging Technologies, Inc., La Miranda, CA (US)

( * ) Notice: Subject to any disclaimer, the term of this patent is extended or adjusted under 35 U.S.C. 154(b) by 111 days.

(21) Appl. No.: 15/067,283

(22) Filed: Mar. 11, 2016

(65) Prior Publication Data

US 2016/0276845 A1   Sep. 22, 2016

Related U.S. Application Data

(60) Provisional application No. 62/136,030, filed on Mar. 20, 2015.

(51) Int. Cl.
| | |
|---|---|
| *H02J 7/00* | (2006.01) |
| *H02M 7/44* | (2006.01) |
| *H02M 1/42* | (2007.01) |
| *H02J 7/02* | (2016.01) |
| *H02J 3/01* | (2006.01) |

(52) U.S. Cl.
CPC .......... *H02J 7/0013* (2013.01); *H02J 7/0018* (2013.01); *H02J 7/02* (2013.01); *H02M 1/42* (2013.01); *H02M 7/44* (2013.01); *H02J 3/01* (2013.01); *Y02E 40/40* (2013.01)

(58) Field of Classification Search
CPC .......... H02J 7/0013; H02J 3/01; H02J 7/0018; H02J 7/02; H02M 1/42; H02M 7/44; Y02E 40/40
See application file for complete search history.

(56) References Cited

U.S. PATENT DOCUMENTS

| | | | |
|---|---|---|---|
| 6,664,762 B2 | 12/2003 | Kutkut | |
| 7,173,429 B2 | 2/2007 | Kutkut et al. | |
| 2004/0189251 A1* | 9/2004 | Kutkut | H02J 7/022 320/128 |
| 2014/0361624 A1* | 12/2014 | Ault | H02J 9/062 307/65 |

* cited by examiner

*Primary Examiner* — Vuthe Siek
(74) *Attorney, Agent, or Firm* — Allen, Dyer, Doppelt + Gilchrist, PA

(57) ABSTRACT

A system for charging at least one battery may include a power and data communication bus including a plurality of AC and DC power lines and data communication lines, and a plurality of modular ports coupled thereto. Charging power modules and an inverter module(s) may be coupled to respective modular ports of the power and data communication bus. A central controller may be configured to communicate with the charging power modules and the inverter module(s) through the data communication lines, identify the charging power modules and the inverter module(s) coupled to the modular ports, along with respective functions and power ratings associated therewith, and selectively control the charging power modules and the inverter module(s) based upon their identified functions and power ratings to charge the at least one battery via the DC power lines and provide AC power back to the AC source.

20 Claims, 4 Drawing Sheets

AUTONOMOUS BATTERY CHARGING SYSTEM AND RELATED METHODS

RELATED APPLICATIONS

This application claims the benefit of provisional application Ser. No. 62/136,030 filed Mar. 20, 2015, which is hereby incorporated herein in its entirety by reference.

TECHNICAL FIELD

The present invention relates generally to battery chargers and, more specifically, to a method and control scheme to improve charger efficiency and power factor.

BACKGROUND

Battery charging is an electrochemical process in which the discharged electric energy is replenished from an electric network. The quality of the charging process is critical to the health and longevity of batteries. As such, battery chargers need to be fitted with advanced controls to optimize charging and prolong battery life.

Since batteries are direct current (DC) sources, most battery charging systems in use today employ a power conversion stage that converts the incoming alternating current (AC) power to DC output. FIG. 1 shows a typical single stage high frequency battery charger 100. The typical battery charging system of FIG. 1 receives AC input power from an AC source (not shown). An input rectifier 101 (here an LC filter) converts the input AC into high voltage DC. The input rectifier 101 is followed by a power conversion stage 102 including switching devices 103 (here diodes) and a capacitor 104, a high frequency inverter 105, a high frequency transformer 106, an output rectifier 107 and an LC filtering stage 108 to convert the high frequency AC output into a DC voltage compatible with the battery voltage. Finally, control and sensing circuitry 109, 110, along with a microprocessor 111, are employed to control the charge process and implement the desired charging algorithm, i.e., the rules or parameters by which the battery is to be charged.

Recently, modular charging systems have been proposed where the power stage includes one or more power stages that are operated in parallel to provide DC charging power to the battery. FIG. 2 shows a typical modular charging 200. The charger includes a plurality of modular power stages 201 with associated control circuitry, where each of the modular power stages may have the same architecture as the charger 100 of FIG. 1. However, the power rating of the modular power stages 201 is less than that of a single stage battery charger, as the power rating of the aggregation of the power stages is equivalent to that of the single stage charger. Typically, a controller 202 may provide a data and communication process along with a central microprocessor to control the operation of the power stages 201 and charging process. Further details on such charging configurations are set forth in U.S. Pat. Pub. No. 2004/0189251 to Kutkut et al., which is hereby incorporated herein in its entirety by reference.

SUMMARY

A system for charging at least one battery may include a power and data communication bus including a plurality of AC power lines to distribute AC power from an AC power source, a plurality of DC power lines to aggregate DC power to the at least one battery, a plurality of data communication lines, and a plurality of modular ports coupled to the plurality of AC power lines, the plurality of DC power lines, and the plurality of data communication lines. The system may further include a plurality of charging power modules each coupled to a respective modular port of the power and data communication bus, at least one inverter module coupled to a respective modular port to convert DC power from the at least one battery into AC power and provide the AC power back to the AC source, and a central controller. The central controller may be configured to communicate with the charging power modules and the at least one inverter module through the plurality of data communication lines of the power and data communication bus, identify the charging power modules and the at least one inverter module coupled to the modular ports, along with respective functions and power ratings associated therewith, and selectively control the charging power modules and the at least one inverter module based upon their identified functions and power ratings to charge the at least one battery via the DC power lines and provide AC power back to the AC source.

More particularly, at least some of the plurality of charging power modules may have different respective power ratings associated therewith. Furthermore, the at least one inverter module may comprise a plurality of inverter modules coupled to respective modular ports, and each having different respective power ratings associated therewith. In addition, the at least one inverter module may be further configured to filter input AC power from the AC power source and provide the filtered input AC power to the plurality of charging power modules. By way of example, the at least one inverter module may filter the input AC power by measuring input AC current harmonics and injecting harmonics of equal and opposite polarity to cancel the input AC current harmonics.

Additionally, the system may further include a printed circuit board (PCB), and the plurality of AC power lines, the plurality of DC power lines, and the plurality of data communication lines may be printed on the PCB. Moreover, the plurality of modular ports may be on the PCB and coupled to the plurality of AC power lines, the plurality of DC power lines, and the plurality of data communication lines. Furthermore, the central controller may operate the at least one inverter module to perform a sulfated battery recovery cycle. Also, the central controller may be further configured to communicate with a power grid and change a frequency of charging and discharging of the at least one battery responsive to commands from the power grid.

DETAILED DESCRIPTION

Generally speaking, the present disclosure relates to an autonomous and flexible battery charging system including of one or more charging modules, one or more active filtering modules and/or one or more inverter modules, and modular and autonomous AC, DC, and signal and data communication busses for distributing AC power, aggregating DC power, and providing bidirectional signal and data communication autonomously to the charging and filtering modules. The active filters function to help ensure a relatively high power factor and low current total harmonic distortion, while the inverter modules function to convert DC power from the battery and inject AC power back into the AC source to provide reactive power, reduce power demand, recycle or recover batteries efficiently, and/or provide frequency regulation functionality.

By way of background, one of the main challenges with most conventional high frequency chargers in use today is the polluting nature of the AC power drawn by the chargers, whether a single stage or modular. Since most charging systems employ an input diode rectifier to convert the input AC into a high voltage DC, the input AC current drawn from the AC input is not sinusoidal. This results in a power factor that is typically less than unity, and a total current harmonic distortion (THD) that is quite high. While the power factor may be improved with the addition of AC or DC line reactors, the maximum attainable power factor in a three phase high frequency charger remains less than 95%. In addition, the current THD is typically higher than 30%. Such low power factor and poor harmonic performance may impact the power grid, and cause additional stress on the transmission and distribution infrastructure. With the advent of the smart grid and the need for battery chargers to be more grid friendly, for example, additional functionality may be desired in battery charging systems.

Figure 1:
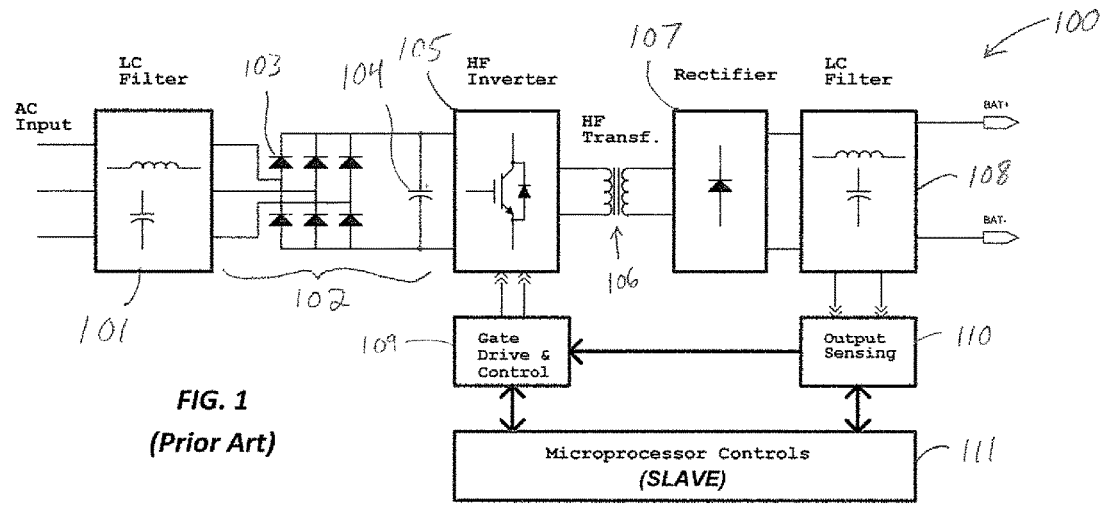
FIG. 1 is a schematic block diagram of a typical high frequency battery charger configuration.
Figure 2:
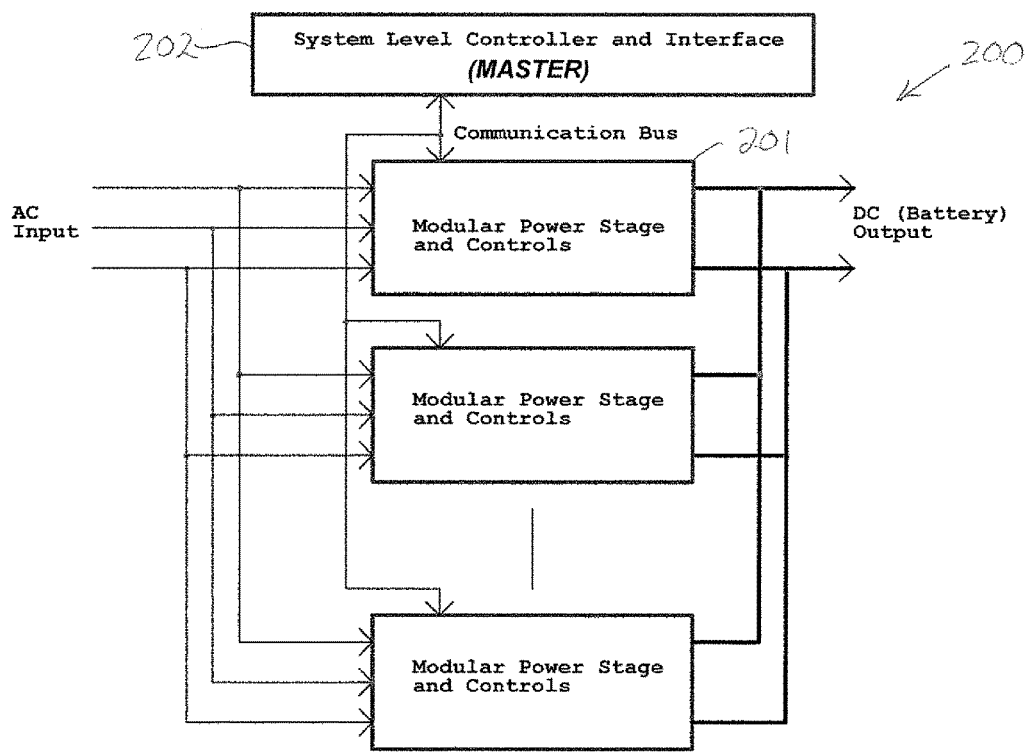
FIG. 2 is a schematic block diagram of a typical modular battery charger configuration.
Figure 3:
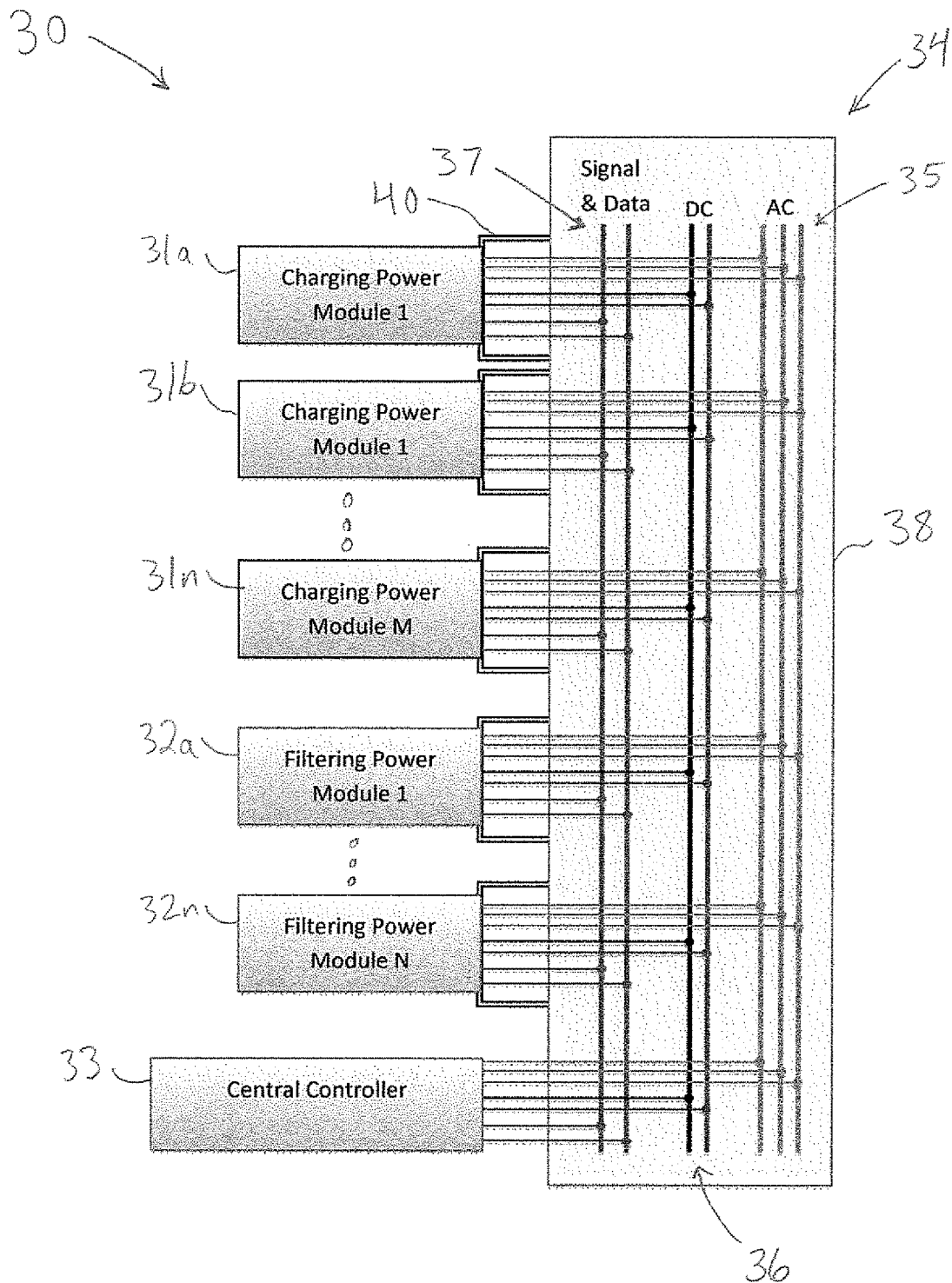
FIG. 3 is a schematic block diagram of a modular battery charging system in accordance with an example embodiment.

Referring initially to FIG. 3, an autonomous and flexible battery charging system 30 is first described. Building on a modular battery charger design, the battery charging system 30 illustratively includes one or more modular power charging stages or modules 31a-31n. Each power stage 31a-31n may have the same or different power levels associated therewith. The system 30 further illustratively includes one or more active filtering modules 32a-32n of the same or different power ratings, and central controller 33. The power charging stages 31a-31n, active filtering modules 32a-32n, and controller 33 are all connected or coupled to a modular bus 34 which illustratively includes autonomous AC power lines power 35, DC power lines 36, and signal/data communication lines 37.

Unlike a typical modular charging system, the battery charging system 30 advantageously provides numerous advantages. For example, as noted above, the charging power modules 31a-31n may advantageously have various different power ratings. For example, the charging power module 31a may have a power rating of 1 kW, while the charging power module 31b may have a rating of 2 kW, for example, although other ratings may be used in different embodiments. Furthermore, the active filtering power modules 32a-32n may similarly have various different power ratings.

Each of the charging and filtering modules 31a-31n and 32a-32n may incorporate a respective microcontroller or microprocessor to communicate with the central controller 33. The modular bus 34 advantageously allows the charging and filtering modules 31a-31n and 32a-32n to be autonomously connected with the AC, DC, and signal/data lines 35, 36, 37. In accordance with one example implementation, the AC, DC, and signal/data lines 35, 36, 37 of the modular bus 34 may be implemented on a printed circuit board (PCB) 38 with AC receptacles or connectors to distribute AC power to each charging or filtering module, DC receptacles or connectors for aggregating DC power from all the charging modules, and signal and data communication receptacles or connectors for distribution control and communication data between all modules.

More particularly, one or more modular PCB mounted connectors 40 may be carried by the PCB 39 to which each of the charging and filtering modules 31a-31n and 32a-32n may be interchangeably coupled or plugged into. In certain configurations, the modular connector 40 may be multiple pins with some dedicated to input AC power, some to data communication, and some to output power (AC or DC). By way of example, the charging and filtering modules 31a-31n and 32a-32n may similarly be implemented on their own respective PCBs which are plugged into the modular ports, similar to the way in which computer cards may be plugged into a motherboard. The central controller 33 may advantageously communicate with the charging and filtering modules 31a-31n and 32a-32n (e.g., via a broadcast command) through the data bus signal/data lines 37, and each will respond with an identification code that signifies its respective function(s), e.g., whether it is a charging, inverter, or filter module (or both an inverter/filter module, as will be discussed further below).

In accordance with an example implementation, the central controller 33, which may be implemented using a microcontroller or a microprocessor and associated non-transitory computer-readable medium having instructions for performing the noted steps or operations described herein, communicates with each of the charging and filtering modules 31a-31n and 32a-32n over the signal/data lines 37 and identifies its respective function, whether charging or filtering, through a unique ID stored in each module, for example. As noted above, each of the charging and filtering modules 31a-31n and 32a-32n may include a microcontroller or microprocessor and associated communications circuitry for communicating with the central controller 33. By way of example, the central controller 33 and the charging and filtering modules 31a-31n and 32a-32n may use various data communication protocols for communication therebetween, such as CAN, RS-485, and other suitable data communication protocols.

The active filtering modules 32a-32n may advantageously function to clean up the input AC power to ensure that a clean sinusoidal current is drawn from the AC input with a power factor of nearly 100%, and current THD of less than 10% or 5%. This is achieved by measuring the input AC current harmonics, other than the fundamental, on the AC input distribution bus and injecting harmonics of equal and opposite polarity to cancel such harmonics.

The central controller 33 may control operation of the entire charging system 30 by activating the respective charging and filtering modules 31a-31n and 32a-32n to be used to achieve the desired charging regimen. For example, in an implementation including four charging modules 31a-31n, two rated at 1 kW, a second rated at 1.5 kW, and another rated at 2 kW, the central controller 33 may activate the respective charging modules that will match the DC battery needs. More particularly, if the battery requires 5 kW or more of charging power, then all modules will be activated. However, if the battery requires only 3 kW of charging power, then the 2 kW module along with one of the 1 kW modules will be activated. If more than one module 31a-31n can be selected, then the selection of modules may be based on factors such as operational hours, or on aggregate kWhrs of runtime that each charging module has logged, for example.

Similarly, the central controller 33 may activate the active filter modules 32a-32n based on the AC current drawn from the AC source. Note that the rating of the filtering modules 32a-32n is typically a fraction of the overall rating of the charging system 30. For example, if the aggregate charging system rating is 10 kW, then the rating of the active filtering required to achieve current THD of less than 5% and unity power factor will be in the 30%-40% range, namely 3-4 kVA. If more than one filtering module 32a-32n is used, then the central controller 33 may operate all or some based on the power drawn from the AC input.

Figure 4:
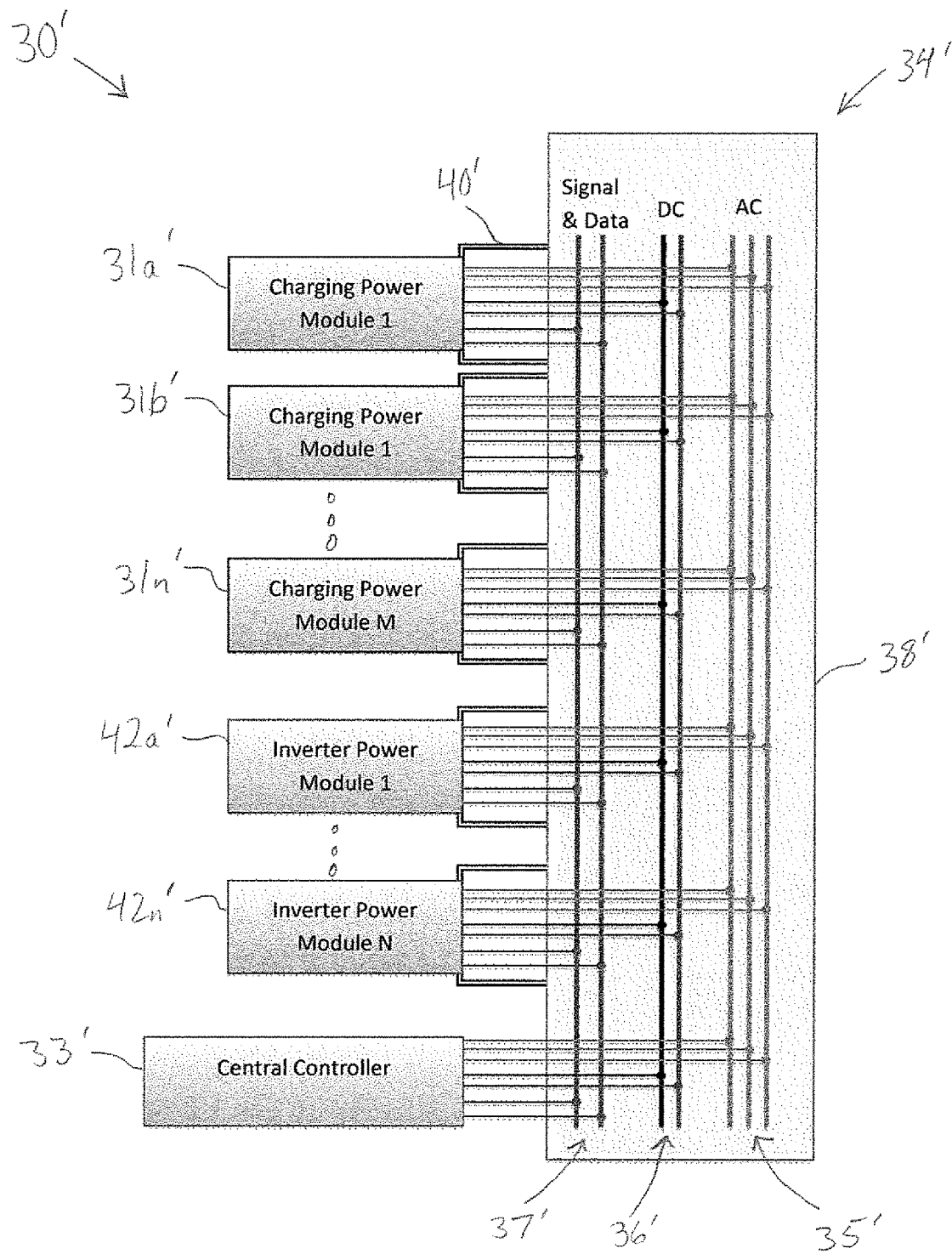
FIG. 4 is a schematic block diagram of a modular battery charging system in accordance with another example embodiment.

In accordance with another example embodiment now described with respect to FIG. 4, the battery charging system 30' illustratively includes one or more modular power charging stages 31a'-31b', where each power stage may be similar to those described above and have the same or different power levels, as well as one or more inverter modules 42a'-42n' of various power ratings. Here again a modular bus 34' is used including AC, DC, and signal/data lines 35', 36', 37' on a PCB 38' with modular ports 40', and a central controller 33' similar to those described above are also illustratively included. Unlike the charger modules 31a'-31b', the inverter modules 42a'-42n' convert DC power from the DC battery and inject AC power back into the AC source.

In contrast to a typical modular charging system, the battery charging system 30' may provide various advantages. For example, the system 30' advantageously provides for charging power modules 31a'-31b' with different power ratings. For example, one charging power module may have a power rating of 1 kW, while another one may have a rating of 2 kW, etc. Furthermore, inverter power modules 42a'-42n' of different power ratings may also be used that convert DC power from the DC battery and inject AC power back into the AC source. In addition, each of the charging and inverter modules 31a'-31b' and 42a'-42n' may incorporate a microcontroller or microprocessor to communicate with the central controller 33', as discussed above. Moreover, the modular plug-and-play AC, DC, and signal and data distribution lines 35', 36', 37' provide for autonomous connection of the charging and inverter modules 31a'-31b' and 42a'-42n' thereto. As noted above, the AC, DC, and signal and data distribution lines 35', 36', 37' may be implemented on a PCB with AC receptacles or connectors to distribute AC power to each charging or filtering module, DC receptacles or connectors for aggregating DC power from all the charging modules, and signal and data communication receptacles or connectors for distribution control and communication data between all modules.

The main central controller 33', which again may be implemented using a microcontroller or a microprocessor and associated non-transitory computer-readable medium, communicates with each charging and inverter module 31a'-31b' and 42a'-40n' over the signal/data communication lines 37', and each module may respectively identify its function, whether charging or inversion, through a unique ID stored in the given module. Each of the charging and inverter modules 31a'-31b' and 42a'-42n' may similarly incorporate a microcontroller or microprocessor and associated non-transitory computer-readable medium, and circuitry to communicate with the central controller 33'. Here again, various data communication protocols may be used for communication between the central controller 33' and the microcontroller or microprocessor in each charging and filtering module 31a'-31b' and 42a'-42n' including CAN, RS-485 or other data communication protocols, for example.

The inverter modules 42a'-42n' are programmed to convert power from the DC battery back into the AC source, or to inject reactive power into the AC system in response to a command from an external controller, such as a utility command and control center, for example. Such inverters may be grid tie type inverters that comply with applicable power quality and safety requirements, for example. This will allow the charging system 30' to work more intelligently with smart power grid systems which may require equipment to be smarter and more capable or adaptable. More particularly, injecting reactive power allows the grid to generate reactive power where it is needed and help ensure better stability of the power grid. In fact, a user of the charging system 30' may in some applications be paid for providing such ancillary service.

Another function of the inverter modules 42a'-42n' is to restore DC power from the battery and convert that back into AC power that may be injected into the AC power source (discharge function). In this scenario, the battery is used as an energy storage device. The injected power may help reduce the peak AC power demand at a facility, participate in demand response programs, and potentially generate revenue for potential customers that have excess battery capacity.

Still another function of the inverter modules 42a'-42n' is the recycling and restoration of sulfated batteries, where sulfated batteries are charged and then discharged efficiently by injecting the power back into the AC source, thus recouping the energy costs incurred during the charging process. Note that injecting power back into the AC source in some instances will cause the power meter to spin backwards, thus recouping previously used AC power.

Yet another function of the inverter modules 42a'-42n' is that they enable the charging system 30', along with the associated batteries, to provide frequency regulation functionality, where the overall charging system responds to central commands from the power grid to switch between charging and discharging rapidly to control the power system frequency. Such operation may also generate revenue for end users, thus helping to maximize the return on their asset investments.

As such, the systems 30, 30' may advantageously provide added functionality that is absent in typical charging systems, including better AC performance in terms of a high power factor, and low current THD. Moreover, the present configurations may also provide enhanced interaction with power grids to help ensure optimal operation, as noted above.

It should be noted that while the filtering modules 32a-32n are illustrated herein only in the system 30, and the inverter modules 42a'-42n' are illustrated herein only in the system 30', in some embodiments one or more filtering modules and one or more inverter modules may be used in the same system with one or more charging modules 31a-31n or 31a'-31n'. In other configurations, the inverter modules 42a'-42n' may be configured or programmed to provide the functionality of the filtering modules 32a-32n. That is, the inverter modules 42a'-42n' may be selectively operated to filter input AC power from the AC source when in a battery charging mode, and then to convert DC power to AC and supply it back to the AC source at least some of the time when not in the battery charging mode, for example.

Figure 5:
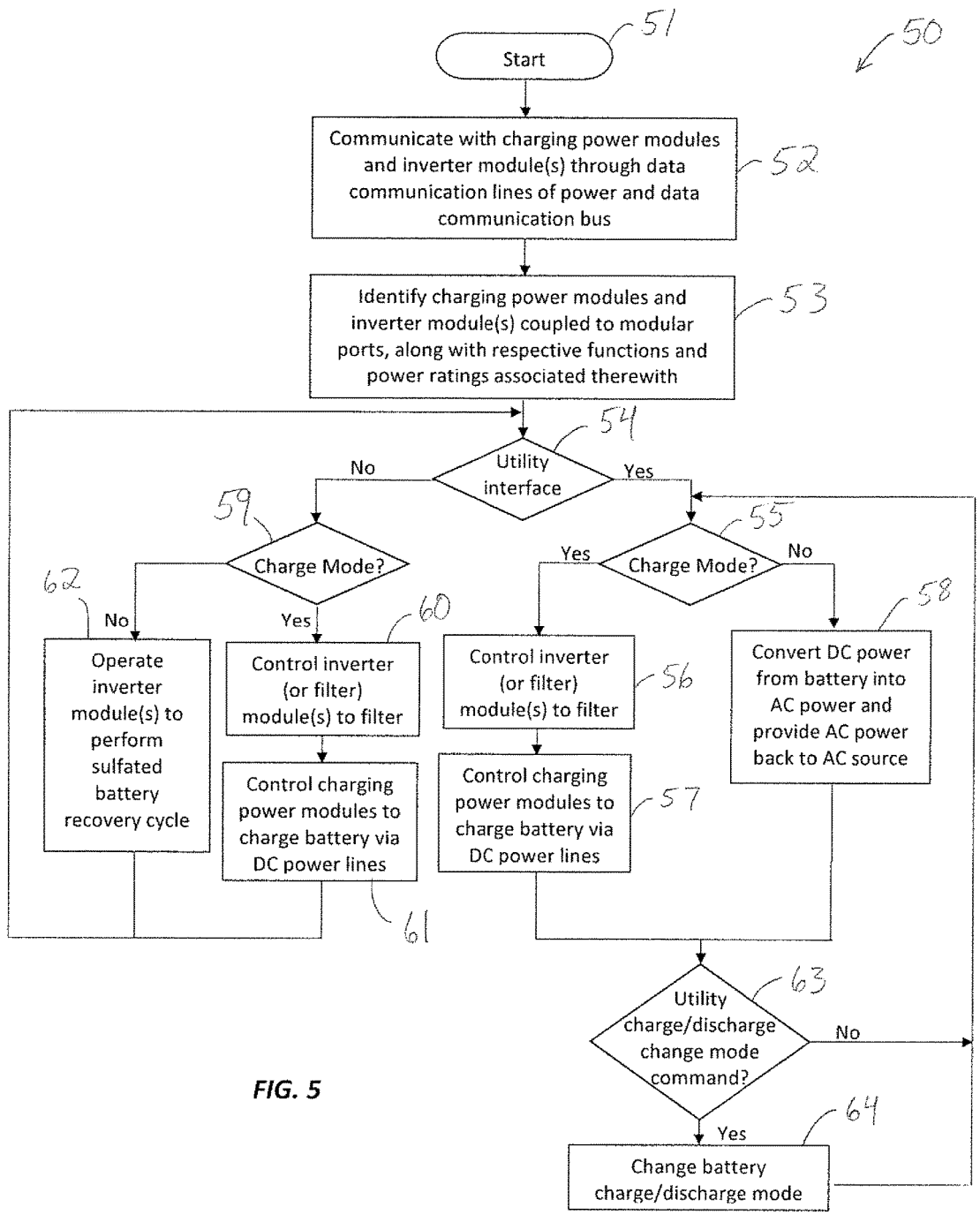
FIG. 5 is a flow diagram illustrating method aspects associated with the systems of FIGS. 4 and 5.

Turning to the flow diagram 50 of FIG. 5, a related battery charging method is now described. Beginning at Block 51, the central controller 33' may communicate with the charging power modules 31a'-31n' and the inverter modules 32a'-32n' through the data communication lines 37' of the power and data communication bus 34', at Block 52, and identify the charging power modules and the inverter modules along with respective functions and power ratings associated therewith, at Block 53. If the central controller 33' is interfacing or cooperating with the power grid (e.g., a utility company), at Block 54, this may be considered a utility or power grid interactive mode. In such case, when in a charging mode (Block 55), the central controller 33' may control the charging power modules 31a'-31n' and the inverter modules 32a'-32n' based upon their identified functions and power ratings to optionally filter the input AC power and charge the battery, at Blocks 56-57. However, as noted above, in some embodiments the filtering power modules 32a-32n may be used to perform the filtering instead of the inverter power modules 42a'-42n'. When not in the charging mode, the inverter modules 32a'-32n' may be used to convert DC power from the battery or batteries into AC power, and provide the AC power back to the AC source (Block 58). Moreover, when the charging system is coupled to the power grid, the central controller 33' may switch between charging and discharging modes to meet the needs of the power grid (or utility company) based upon a utility command, and optionally change a frequency of charging and/or discharging of the battery or batteries, etc., at Blocks 63-64.

If the central controller 33' is not interfacing or cooperating with the power grid (i.e., a standalone mode), here again when in a charging mode (Block 59), the central controller 33' may control the charging power modules 31a'-31n' and the inverter modules 32a'-32n' (or filters) based upon their identified functions and power ratings to optionally filter the input AC power and charge the battery, at Blocks 60-61. In some embodiments, the inverter modules 32a'-32n' may be selectively operated to discharge the battery into the AC grid, such as for capacity testing or to perform a sulfated battery recovery cycle, as noted above (Block 62).

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for charging at least one battery and comprising:
    a power and data communication bus comprising
        a plurality of AC power lines to distribute AC power from an AC power source,
        a plurality of DC power lines to aggregate DC power to the at least one battery,
        a plurality of data communication lines, and
        a plurality of modular ports each coupled to the plurality of AC power lines, the plurality of DC power lines, and the plurality of data communication lines;
    a plurality of charging power modules each coupled to a respective modular port of the power and data communication bus;
    at least one inverter module coupled to a respective modular port to convert DC power from the at least one battery into AC power and provide the AC power back to the AC source; and
    a central controller configured to
        communicate with the charging power modules and the at least one inverter module through the plurality of data communication lines of the power and data communication bus,
        identify the charging power modules and the at least one inverter module coupled to the modular ports, along with respective functions and power ratings associated therewith, and
        selectively control the charging power modules and the at least one inverter module based upon their identified functions and power ratings to charge the at least one battery via the DC power lines and provide AC power back to the AC source.

2. The system of claim 1 wherein at least some of the plurality of charging power modules have different respective power ratings associated therewith.

3. The system of claim 1 wherein the at least one inverter module comprises a plurality of inverter modules coupled to respective modular ports and each having different respective power ratings associated therewith.

4. The system of claim 1 wherein the at least one inverter module is further configured to filter input AC power from the AC power source and provide the filtered input AC power to the plurality of charging power modules.

5. The system of claim 4 wherein the at least one inverter module filters the input AC power by measuring input AC current harmonics and injecting harmonics of equal and opposite polarity to cancel the input AC current harmonics.

6. The system of claim 1 further comprising a printed circuit board (PCB); wherein the plurality of AC power lines, the plurality of DC power lines, and the plurality of data communication lines are printed on the PCB; and wherein the plurality of modular ports are on the PCB and coupled to the plurality of AC power lines, the plurality of DC power lines, and the plurality of data communication lines.

7. The system of claim 1 wherein the central controller operates the at least one inverter module to perform a sulfated battery recovery cycle.

8. The system of claim 1 wherein the central controller is further configured to communicate with a power grid and change a frequency of charging and discharging of the at least one battery responsive to commands from the power grid.

9. A system for charging at least one battery and comprising:
    a power and data communication bus comprising
        a plurality of AC power lines to distribute AC power from an AC power source,
        a plurality of DC power lines to aggregate DC power to the at least one battery,
        a plurality of data communication lines, and
        a plurality of modular ports each coupled to the plurality of AC power lines, the plurality of DC power lines, and the plurality of data communication lines;
    a plurality of charging power modules each coupled to a respective modular port of the power and data communication bus;
    at least one filter module coupled to a respective modular port to filter input AC power from the AC power source and provide the filtered input AC power to the plurality of charging power modules; and
    a central controller configured to
        communicate with the charging power modules and the at least one filter module through the plurality of data communication lines of the power and data communication bus,
        identify the charging power modules and the at least one filter module coupled to the modular ports, along with respective functions and power ratings associated therewith, and selectively control the charging power modules and the at least one filter module based upon their identified functions and power ratings to charge the at least one battery via the DC power lines.

10. The system of claim 9 wherein at least some of the plurality of charging power modules have different respective power ratings associated therewith.

11. The system of claim 9 wherein the at least one filter module comprises a plurality of filter modules coupled to respective modular ports and each having different respective power ratings associated therewith.

12. The system of claim 9 wherein the at least one filter module filters the input AC power by measuring input AC current harmonics and injecting harmonics of equal and opposite polarity to cancel the input AC current harmonics.

13. The system of claim 9 further comprising a printed circuit board (PCB); wherein the plurality of AC power lines, the plurality of DC power lines, and the plurality of data communication lines are printed on the PCB; and wherein the plurality of modular ports are on the PCB and coupled to the plurality of AC power lines, the plurality of DC power lines, and the plurality of data communication lines.

14. A method for charging at least one battery comprising:
coupling the at least one battery to a power and data communication bus comprising a plurality of AC power lines to distribute AC power from an AC power source, a plurality of DC power lines to aggregate DC power to the at least one battery, a plurality of data communication lines, and a plurality of modular ports each coupled to the plurality of AC power lines, the plurality of DC power lines, and the plurality of data communication lines, wherein a plurality of charging power modules are each coupled to a respective modular port of the power and data communication bus, and wherein at least one inverter module is coupled to a respective modular port to convert DC power from the at least one battery into AC power and provide the AC power back to the AC source;
using a central controller coupled to the plurality of data communication lines to communicate with the charging power modules and the at least one inverter module through the plurality of data communication lines of the power and data communication bus;
using the central controller to identify the charging power modules and the at least one inverter module coupled to the modular ports, along with respective functions and power ratings associated therewith; and
using the central controller to selectively control the charging power modules and the at least one inverter module based upon their identified functions and power ratings to charge the at least one battery via the DC power lines and provide AC power back to the AC source.

15. The method of claim 14 wherein at least some of the plurality of charging power modules have different respective power ratings associated therewith.

16. The method of claim 14 wherein the at least one inverter module comprises a plurality of inverter modules coupled to respective modular ports and each having different respective power ratings associated therewith.

17. The method of claim 14 further comprising using the central controller to cause the at least one inverter module to filter input AC power from the AC power source and provide the filtered input AC power to the plurality of charging power modules.

18. The method of claim 17 wherein the at least one inverter module filters the input AC power by measuring input AC current harmonics and injecting harmonics of equal and opposite polarity to cancel the input AC current harmonics.

19. The method of claim 14 wherein the plurality of AC power lines, the plurality of DC power lines, and the plurality of data communication lines are printed on a printed circuit board (PCB); and wherein the plurality of modular ports are on the PCB and coupled to the plurality of AC power lines, the plurality of DC power lines, and the plurality of data communication lines.

20. The method of claim 14 further comprising using the central controller to operate the at least one inverter module to perform a sulfated battery recovery cycle.

* * * * *